Patented Nov. 8, 1949

2,487,393

UNITED STATES PATENT OFFICE 2,487,393

PROCESS FOR THE MANUFACTURE OF FOLIC ACID

Hans Spiegelberg, Basel, Switzerland, assignor to Hoffmann-La Roche Inc., Nutley, N. J., a corporation of New Jersey No Drawing. Application March 6, 1948, Serial No. 13,515. In Switzerland May 20, 1947

2 Claims. (Cl. 260—251)

The present invention relates to the manufacture of folic acid.

Folic acid may be prepared by reacting p-aminobenzoyl-1-(+)-glutamic acid with 2-amino-4-hydroxy-6-(chlormethyl)-pteridine, the latter being obtainable from 2-amino-4-hydroxy-6-(hydroxymethyl)-pteridine by replacing the hydroxyl of the hydroxymethyl group by chlorine. The p-aminobenzoyl-1-(+)-glutamic acid may be prepared by the reduction of p-nitro-benzoyl-1-(+)-glutamic acid.

It has now been found, according to the present invention, that folic acid can be prepared simply and in good yield by hydrogenating p-nitro-benzoyl-1-(+)-glutamic acid in the presence of 2-amino-4-hydroxy-6-(hydroxymethyl)-pteridine.

Accordingly a process is provided for the manufacture of folic acid which comprises catalytically hydrogenating p-nitro-benzoyl-1-(+)-glutamic acid in the presence of 2-amino-4-hydroxy-6-(hydroxymethyl)-pteridine. The reaction may be conveniently be conducted in a solvent inert to the reactants; formic acid, for instance, being a suitable solvent.

The 2-amino-4-hydroxy-6-(hydroxymethyl)-pteridine used as a starting material in the present process may conveniently be obtained by condensing dihydroxy-acetone with 2:4:5-triamino-6-hydroxy-pyrimidine in the presence of hydrazine.

The reaction may be illustrated by the following formulae:

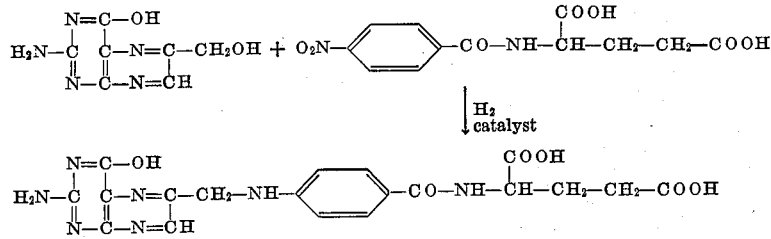

The hydrogenation is accompanied by simultaneous interaction of the pteridine compound and reduction product of the benzoyl-glutamic acid derivative.

The present process is advantageous in that it becomes unnecessary to replace the hydroxymethyl group of the pteridine derivative by a halogenomethyl group. Further, the p-aminobenzoyl-1-(+)-glutamic acid which may be presumed to be formed during the reduction need not be isolated. The rather sensitive vitamin molecule is therefore built up under very mild reaction conditions.

The following example illustrates the nature of the present invention.

Example 10 parts by weight of 2-amino-4-hydroxy-6-(hydroxymethyl)-pteridine and 15 parts by weight of p-nitrobenzoyl-1-(+)-glutamic acid are dissolved in 150 parts by weight of 100 per cent. formic acid and hydrogenated under normal pressure at room temperature in the presence of 2.5 parts by weight of palladium charcoal containing 10 per cent. palladium. After 220 parts by volume of hydrogen have been taken up the hydrogenation is discontinued and the catalyst is filtered off. The filtrate is concentrated to dryness at a bath temperature of 40° C. under a pressure of about 12 mm. Hg. The residue is suspended in 250 parts of water and ammonia is added until complete dissolution has taken place. When tested by the aid of Streptococcus lactis R this solution is clearly proved to possess folic acid activity, corresponding in the degree to about 1.5 parts by weight of pure folic acid. Folic acid may be isolated from this solution in a manner known per se, for instance, through the sparingly soluble zinc and the easily soluble barium salts.

I claim:

1. The process which comprises catalytically hydrogenating, in a solvent, p-nitrobenzoyl-1-(+)-glutamic acid in the presence of 2-amino-4-hydroxy-6-(hydroxymethyl)-pteridine so as to produce folic acid.

2. Process in accordance with claim 1, comprising using formic acid as the solvent.

HANS SPIEGELBERG.

No references cited.